J. F. Seiberling.

Harvester Drapper.

No. 1702. Reissued June 11, 1861.

John F. Seiberling
by
Daniel Breed Atty

G. Rhodes
J. Brown Jr.

UNITED STATES PATENT OFFICE.

JOHN F. SEIBERLING OF DOYLESTOWN, OHIO.

IMPROVEMENT IN HARVESTERS.

Specification forming part of Letters Patent No. 33,496, dated October 15, 1861; Reissue No. 1,702, dated June 14, 1864.

DIVISION E.

*To all whom it may concern:*

Be it known that I, JOHN F. SEIBERLING, of Doylestown, Wayne county, Ohio, have invented a new and useful Improvement in Harvesters; and I do hereby declare that the following is a full and exact description of the same, reference being had to the accompanying drawings, and to the letters of reference marked thereon.

As harvesters carry a reel and platform, it is very difficult so to hinge and balance the finger-beam as to allow the latter to fold horizontally backward while its outer end is supported on a caster-wheel. Many years of experience in the manufacture and use of harvesters has enabled me to invent a successful mode of thus supporting and folding the finger-beam.

My invention consists in automatically folding the finger-beam of a harvester horizontally backward by supporting the outer end of such beam on a caster-wheel operating as herein specified.

In the accompanying description I show how my invention may be put into practice; but I do not confine myself to the precise devices herein described.

Figure 1:
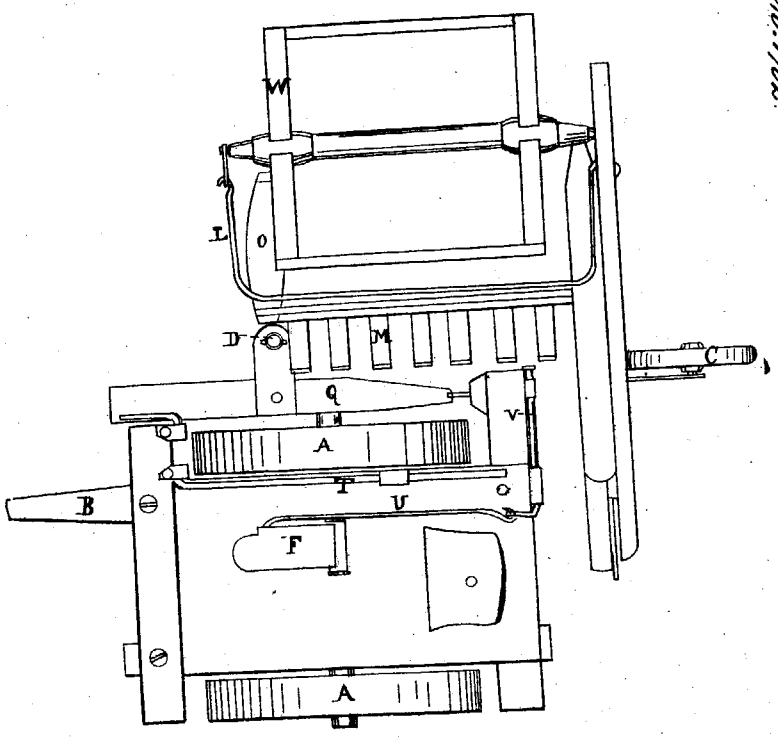
Figure 1:
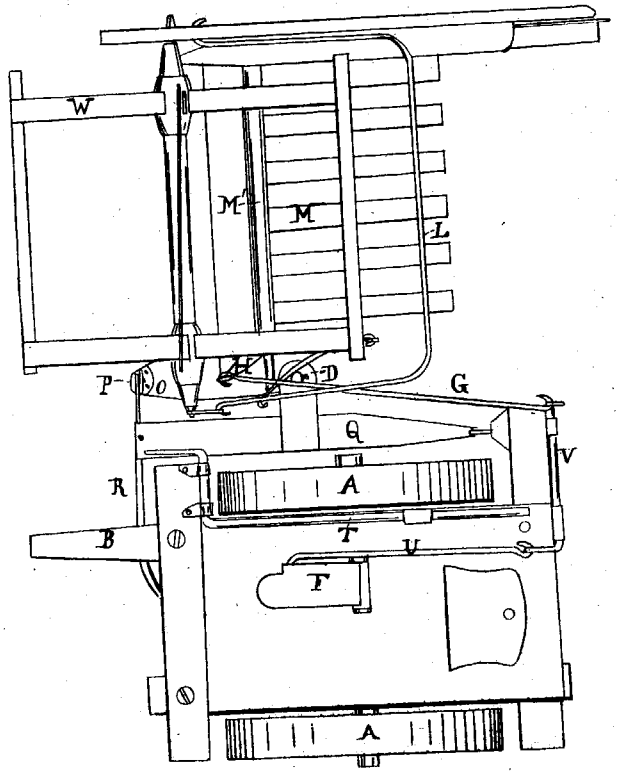

In the accompanying drawings, Figure 1 is a top view of my harvester in working position. Fig. 4 is the same with the finger-beam folded backward, (there being no Figs. 2 or 3.)

In the drawings, A represents the wheels carrying the frame of the machine, and drawn in the usual manner. A third wheel is placed under the outer shoe to carry the point or outer end of the finger-beam, and to support in part the reel, platform, outer shoe, and dividing-board, and thus prevent the otherwise heavy side drag of the machine. This third wheel is hinged so as to act like a caster-wheel, yet it is made very strong. It is best seen at C, Fig. 4, where it is turned outward from the outer shoe. The heel of the finger, when in working position, is carried by a shoe, O, held in place by two flexible joints, D and P. When the finger-beam is to be folded for transportation the pin is withdrawn from joint P, so as to release the forward end of the shoe. This allows the finger-beam a free horizontal motion backward upon the strong hinge-joint D, as shown in Fig. 4. As the finger-beam revolves backward the caster-wheel C turns outward on its long hinge, throwing the point of support forward and nearer the finger-beam, in order better to balance the latter upon the hinge D and caster-wheel C. Not only the finger-beam, but the reel W, the platform M M′, the outer shoe, and dividing-board are carried in part on the caster-wheel C and revolve backward with the finger-beam. This mode of folding the finger-beam renders it necessary to raise the rear end of the platform or fingers M in order to bring the finger-beam close to the line of the track of the right wheel A; and with my machine the cut-off L and rod G must be elevated out of the way of reel W as it folds backward with the finger-beam.

I do not broadly claim the use of a caster-wheel for relieving the side drag of harvesters; but,

Having thus fully described my invention, what I claim, and desire to secure by Letters Patent of the United States, is—

A finger-beam provided with a caster-wheel at its outer end and a horizontally-folding hinge at its inner end, whereby said finger-beam is rendered capable of folding automatically to the side of the main frame for the purpose of transportation, substantially as set forth.

JOHN F. SEIBERLING.

Witnesses:

AMOS HENRICKS,

ABRAHAM B. CAPP.